United States Patent
Artes et al.

(10) Patent No.: US 11,175,670 B2
(45) Date of Patent: Nov. 16, 2021

(54) ROBOT-ASSISTED PROCESSING OF A SURFACE USING A ROBOT

(71) Applicant: RobArt GmbH, Linz (AT)

(72) Inventors: Harold Artes, Linz (AT); David Conti, Linz (AT); Christoph Freudenthaler, Linz (AT); Erwin Mascher, Linz (AT); Reinhard Vogel, Linz (AT)

(73) Assignee: RobArt GmbH, Linz (AT)

(*) Notice: Subject to any disclaimer, the term of this patent is extended or adjusted under 35 U.S.C. 154(b) by 247 days.

(21) Appl. No.: 15/982,657

(22) Filed: May 17, 2018

(65) Prior Publication Data
US 2018/0267552 A1 Sep. 20, 2018

Related U.S. Application Data

(63) Continuation-in-part of application No. PCT/AT2016/060110, filed on Nov. 15, 2016.

(30) Foreign Application Priority Data

Nov. 17, 2015 (DE) ...................... 10 2015 119 865.7

(51) Int. Cl.
G05D 1/02 (2020.01)
A47L 9/28 (2006.01)
A47L 9/00 (2006.01)
G01C 21/00 (2006.01)
(Continued)

(52) U.S. Cl.
CPC ............ *G05D 1/0219* (2013.01); *A47L 9/009* (2013.01); *A47L 9/2805* (2013.01); *A47L 9/2852* (2013.01);
(Continued)

(58) Field of Classification Search
CPC ............... G05D 1/0219; A47L 2201/04; A47L 2201/06
See application file for complete search history.

(56) References Cited

U.S. PATENT DOCUMENTS 4,674,048 A 6/1987 Okumura
4,740,676 A 4/1988 Satoh et al.
(Continued)

FOREIGN PATENT DOCUMENTS

AU 2015322263 4/2017
CA 2322419 9/1999
(Continued)

OTHER PUBLICATIONS

Forlizzi, How robotic products become social products: An ethnographic study of cleaning in the home, 2007, IEEE, p. 129-136 (Year: 2007).
(Continued)

*Primary Examiner* — Todd Melton
(74) *Attorney, Agent, or Firm* — Akerman LLP; Peter A. Chiabotti

(57) ABSTRACT

A method for processing a surface of an area to be processed using an autonomous mobile robot. The method includes the steps of controlling the robot in order to process the area according to a first processing pattern, monitoring a region in the surroundings of the robot, wherein the region has a fixed position relative to the robot, and controlling the robot in order to process the area according to a second processing pattern if a reachable and unprocessed region is detected in the monitored region.

25 Claims, 7 Drawing Sheets

(51) Int. Cl.
  *G05D 1/00*  (2006.01)
  *A01D 34/00*  (2006.01)
(52) U.S. Cl.
  CPC ........... *G01C 21/00* (2013.01); *G05D 1/0088* (2013.01); *G05D 1/0274* (2013.01); *A01D 34/008* (2013.01); *A47L 2201/04* (2013.01); *G05D 1/0246* (2013.01); *G05D 1/0255* (2013.01); *G05D 2201/0208* (2013.01); *G05D 2201/0215* (2013.01)

(56) References Cited

U.S. PATENT DOCUMENTS

| | | | |
|---|---|---|---|
| 4,777,416 | A | 10/1988 | George, II et al. |
| 5,109,566 | A | 5/1992 | Kobayashi et al. |
| 5,260,710 | A | 11/1993 | Omamyuda et al. |
| 5,284,522 | A | 2/1994 | Kobayashi et al. |
| 5,377,106 | A | 12/1994 | Drunk et al. |
| 5,402,051 | A | 3/1995 | Fujiwara et al. |
| 5,696,675 | A | 12/1997 | Nakamura et al. |
| 5,787,545 | A | 8/1998 | Colens |
| 5,995,884 | A | 11/1999 | Allen et al. |
| 6,366,219 | B1 | 4/2002 | Hommady |
| 6,389,329 | B1 | 5/2002 | Colens |
| 6,532,404 | B2 | 3/2003 | Colens |
| 6,594,844 | B2 | 7/2003 | Jones |
| 6,605,156 | B1 | 8/2003 | Clark et al. |
| 6,615,108 | B1 | 9/2003 | Peless et al. |
| 6,667,592 | B2 | 12/2003 | Jacobs et al. |
| 6,690,134 | B1 | 2/2004 | Jones et al. |
| 6,732,826 | B2 | 5/2004 | Song et al. |
| 6,764,373 | B1 | 7/2004 | Osawa et al. |
| 6,781,338 | B2 | 8/2004 | Jones et al. |
| 6,809,490 | B2 | 10/2004 | Jones et al. |
| 6,965,209 | B2 | 11/2005 | Jones et al. |
| 6,972,834 | B1 | 12/2005 | Oka et al. |
| 7,155,308 | B2 | 12/2006 | Jones |
| 7,173,391 | B2 | 2/2007 | Jones et al. |
| 7,196,487 | B2 | 3/2007 | Jones et al. |
| 7,302,345 | B2 | 11/2007 | Kwon et al. |
| 7,388,343 | B2 | 6/2008 | Jones et al. |
| 7,389,156 | B2 | 6/2008 | Ziegler et al. |
| 7,448,113 | B2 | 11/2008 | Jones et al. |
| 7,483,151 | B2 | 1/2009 | Zganec et al. |
| 7,507,948 | B2 | 3/2009 | Park et al. |
| 7,539,557 | B2 | 5/2009 | Yamauchi |
| 7,571,511 | B2 | 8/2009 | Jones et al. |
| 7,636,982 | B2 | 12/2009 | Jones et al. |
| 7,656,541 | B2 | 2/2010 | Waslowski et al. |
| 7,761,954 | B2 | 7/2010 | Ziegler et al. |
| 7,801,676 | B2 | 9/2010 | Kurosawa et al. |
| 8,438,695 | B2 | 5/2013 | Gilbert et al. |
| 8,594,019 | B2 | 11/2013 | Misumi |
| 8,739,355 | B2 | 6/2014 | Morse et al. |
| 8,855,914 | B1 * | 10/2014 | Alexander ........... G05D 1/0219 701/400 |
| 8,892,251 | B1 | 11/2014 | Dooley et al. |
| 8,921,752 | B2 | 12/2014 | Iizuka |
| 8,982,217 | B1 | 3/2015 | Hickman |
| 9,002,511 | B1 | 4/2015 | Hickerson et al. |
| 9,026,302 | B2 * | 5/2015 | Stout ................... G05D 1/0274 701/25 |
| 9,037,294 | B2 | 5/2015 | Chung et al. |
| 9,043,017 | B2 | 5/2015 | Jung et al. |
| 9,149,170 | B2 | 10/2015 | Ozick et al. |
| 9,220,386 | B2 | 12/2015 | Gilbert, Jr. et al. |
| 9,486,924 | B2 | 11/2016 | Dubrovsky et al. |
| 10,228,697 | B2 * | 3/2019 | Yoshino ............... G05D 1/0274 |
| 2002/0016649 | A1 | 2/2002 | Jones |
| 2002/0103575 | A1 | 8/2002 | Sugawara |
| 2002/0120364 | A1 | 8/2002 | Colens |
| 2003/0025472 | A1 | 2/2003 | Jones et al. |
| 2003/0030398 | A1 | 2/2003 | Jacobs et al. |
| 2003/0120389 | A1 | 6/2003 | Abramson |
| 2003/0142925 | A1 | 7/2003 | Melchior et al. |
| 2004/0020000 | A1 | 2/2004 | Jones |
| 2004/0049877 | A1 | 3/2004 | Jones et al. |
| 2004/0187457 | A1 | 9/2004 | Colens |
| 2004/0207355 | A1 | 10/2004 | Jones et al. |
| 2005/0000543 | A1 | 1/2005 | Taylor et al. |
| 2005/0010331 | A1 | 1/2005 | Taylor et al. |
| 2005/0041839 | A1 | 2/2005 | Saitou et al. |
| 2005/0067994 | A1 | 3/2005 | Jones et al. |
| 2005/0156562 | A1 | 7/2005 | Cohen et al. |
| 2005/0171636 | A1 | 8/2005 | Tani |
| 2005/0171644 | A1 | 8/2005 | Tani |
| 2005/0204717 | A1 | 9/2005 | Colens |
| 2005/0212680 | A1 | 9/2005 | Uehigashi |
| 2005/0256610 | A1 | 11/2005 | Orita |
| 2006/0012493 | A1 | 1/2006 | Karlsson et al. |
| 2006/0020369 | A1 | 1/2006 | Taylor |
| 2006/0095158 | A1 | 5/2006 | Lee et al. |
| 2006/0237634 | A1 | 10/2006 | Kim |
| 2007/0027579 | A1 | 2/2007 | Suzuki et al. |
| 2007/0061041 | A1 | 3/2007 | Zweig |
| 2007/0234492 | A1 | 10/2007 | Svendsen et al. |
| 2007/0266508 | A1 | 11/2007 | Jones et al. |
| 2007/0282484 | A1 | 12/2007 | Chung et al. |
| 2008/0046125 | A1 | 2/2008 | Myeong et al. |
| 2008/0140255 | A1 | 6/2008 | Ziegler et al. |
| 2008/0155768 | A1 | 7/2008 | Ziegler et al. |
| 2008/0192256 | A1 | 8/2008 | Wolf et al. |
| 2008/0307590 | A1 | 12/2008 | Jones et al. |
| 2009/0048727 | A1 | 2/2009 | Hong et al. |
| 2009/0051921 | A1 | 2/2009 | Masahiko |
| 2009/0177320 | A1 | 7/2009 | Lee et al. |
| 2009/0182464 | A1 | 7/2009 | Myeong et al. |
| 2009/0281661 | A1 | 11/2009 | Dooley et al. |
| 2010/0030380 | A1 | 2/2010 | Shah et al. |
| 2010/0049365 | A1 | 2/2010 | Jones et al. |
| 2010/0082193 | A1 | 4/2010 | Chiappetta |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2010/0324731 | A1 | 12/2010 | Letsky |
| 2010/0324736 | A1 | 12/2010 | Yoo et al. |
| 2011/0054689 | A1 | 3/2011 | Nielsen et al. |
| 2011/0137461 | A1 | 6/2011 | Kong et al. |
| 2011/0194755 | A1 | 8/2011 | Jeong et al. |
| 2011/0211731 | A1 | 9/2011 | Lee et al. |
| 2011/0224824 | A1 | 9/2011 | Lee et al. |
| 2011/0236026 | A1 | 9/2011 | Yoo et al. |
| 2011/0238214 | A1 | 9/2011 | Yoo et al. |
| 2011/0264305 | A1 | 10/2011 | Choe et al. |
| 2011/0278082 | A1 | 11/2011 | Chung et al. |
| 2011/0295420 | A1 | 12/2011 | Wagner |
| 2012/0008128 | A1 | 1/2012 | Bamji |
| 2012/0013907 | A1 | 1/2012 | Jung et al. |
| 2012/0022785 | A1 | 1/2012 | DiBernardo et al. |
| 2012/0060320 | A1 | 3/2012 | Lee et al. |
| 2012/0069457 | A1 | 3/2012 | Wolf et al. |
| 2012/0169497 | A1 | 7/2012 | Schnittman et al. |
| 2012/0173070 | A1 | 7/2012 | Schnittman |
| 2012/0215380 | A1 | 8/2012 | Fouillade et al. |
| 2012/0223216 | A1 | 9/2012 | Flaherty et al. |
| 2012/0265370 | A1 | 10/2012 | Kim et al. |
| 2012/0271502 | A1 | 10/2012 | Lee |
| 2012/0283905 | A1 | 11/2012 | Nakano et al. |
| 2013/0001398 | A1 | 1/2013 | Wada et al. |
| 2013/0024025 | A1 | 1/2013 | Hsu |
| 2013/0166134 | A1 | 6/2013 | Shitamoto |
| 2013/0206177 | A1 | 8/2013 | Burlutskiy |
| 2013/0217421 | A1 | 8/2013 | Kim |
| 2013/0221908 | A1 | 8/2013 | Tang |
| 2013/0261867 | A1 | 10/2013 | Burnett et al. |
| 2013/0265562 | A1 | 10/2013 | Tang et al. |
| 2013/0317944 | A1 | 11/2013 | Huang et al. |
| 2014/0005933 | A1 | 1/2014 | Fong et al. |
| 2014/0098218 | A1 | 4/2014 | Wu et al. |
| 2014/0100693 | A1 | 4/2014 | Fong et al. |
| 2014/0115797 | A1 | 5/2014 | Duenne |
| 2014/0124004 | A1 | 5/2014 | Rosenstein et al. |
| 2014/0128093 | A1 | 5/2014 | Das et al. |
| 2014/0156125 | A1 | 6/2014 | Song et al. |

(56) References Cited

U.S. PATENT DOCUMENTS

| | | |
|---|---|---|
| 2014/0207280 A1 | 7/2014 | Duffley et al. |
| 2014/0207281 A1 | 7/2014 | Angle et al. |
| 2014/0207282 A1 | 7/2014 | Angle et al. |
| 2014/0218517 A1 | 8/2014 | Kim et al. |
| 2014/0257563 A1 | 9/2014 | Park et al. |
| 2014/0257564 A1 | 9/2014 | Sun et al. |
| 2014/0257565 A1 | 9/2014 | Sun et al. |
| 2014/0303775 A1 | 10/2014 | Oh et al. |
| 2014/0316636 A1 | 10/2014 | Hong et al. |
| 2014/0324270 A1 | 10/2014 | Chang et al. |
| 2014/0343783 A1 | 11/2014 | Lee |
| 2015/0115138 A1 | 4/2015 | Heng et al. |
| 2015/0115876 A1 | 4/2015 | Noh et al. |
| 2015/0120056 A1 | 4/2015 | Noh et al. |
| 2015/0151646 A1 | 6/2015 | Noiri |
| 2015/0168954 A1 | 6/2015 | Hickerson et al. |
| 2015/0173578 A1 | 6/2015 | Kim et al. |
| 2015/0202772 A1 | 7/2015 | Kim |
| 2015/0212520 A1 | 7/2015 | Artes et al. |
| 2015/0223659 A1 | 8/2015 | Han et al. |
| 2015/0260829 A1 | 9/2015 | Wada |
| 2015/0265125 A1 | 9/2015 | Lee et al. |
| 2015/0314453 A1 | 11/2015 | Witelson et al. |
| 2015/0367513 A1 | 12/2015 | Gettings et al. |
| 2016/0008982 A1 | 1/2016 | Artes et al. |
| 2016/0037983 A1 | 2/2016 | Hillen et al. |
| 2016/0041029 A1 | 2/2016 | T'Ng et al. |
| 2016/0066759 A1 | 3/2016 | Langhammer et al. |
| 2016/0103451 A1 | 4/2016 | Vicenti |
| 2016/0132056 A1 | 5/2016 | Yoshino |
| 2016/0150933 A1 | 6/2016 | Duenne et al. |
| 2016/0165795 A1 | 6/2016 | Balutis et al. |
| 2016/0166126 A1 | 6/2016 | Morin et al. |
| 2016/0200161 A1 | 7/2016 | Van Den Bossche et al. |
| 2016/0209217 A1 | 7/2016 | Babu et al. |
| 2016/0213218 A1 | 7/2016 | Ham et al. |
| 2016/0229060 A1 | 8/2016 | Kim et al. |
| 2016/0271795 A1 | 9/2016 | Vicenti |
| 2016/0282873 A1 | 9/2016 | Masaki et al. |
| 2016/0297072 A1 | 10/2016 | Williams et al. |
| 2016/0298970 A1 | 10/2016 | Lindhe et al. |
| 2017/0001311 A1 | 1/2017 | Bushman et al. |
| 2017/0083022 A1 | 3/2017 | Tang |
| 2017/0147000 A1 | 5/2017 | Hoennige et al. |
| 2017/0177001 A1 | 6/2017 | Cao et al. |
| 2017/0197314 A1 | 7/2017 | Stout et al. |
| 2017/0231452 A1 | 8/2017 | Saito et al. |
| 2017/0364087 A1 | 12/2017 | Tang et al. |

FOREIGN PATENT DOCUMENTS

| | | |
|---|---|---|
| CN | 2002-11-27 | 11/2002 |
| CN | 2005-11-16 | 11/2005 |
| CN | 2011-01-12 | 1/2011 |
| CN | 101972129 | 2/2011 |
| CN | 102407522 | 4/2012 |
| CN | 2012-10-17 | 10/2012 |
| CN | 203672362 | 6/2014 |
| CN | 104460663 | 3/2015 |
| CN | 2015-05-20 | 5/2015 |
| CN | 104765362 | 7/2015 |
| CN | 2015-11-11 | 11/2015 |
| CN | 105334847 | 2/2016 |
| CN | 105467398 | 4/2016 |
| CN | 105527619 | 4/2016 |
| CN | 105990876 | 10/2016 |
| DE | 1995-08-17 | 8/1995 |
| DE | 10204223 | 8/2003 |
| DE | 2004-01-22 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| DE | 2018-02-08 | 2/2018 |
| DE | 2018-06-28 | 6/2018 |
| EP | 0142594 | 5/1985 |
| EP | 0402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2012-09-12 | 9/2012 |
| EP | 2012-10-24 | 10/2012 |
| EP | 2511782 | 10/2012 |
| EP | 2573639 | 3/2013 |
| EP | 2595024 | 5/2013 |
| EP | 2740013 | 6/2014 |
| EP | 2741159 | 6/2014 |
| EP | 2015-04-01 | 4/2015 |
| EP | 2870852 | 5/2015 |
| EP | 3079030 | 11/2015 |
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003-11-21 | 11/2003 |
| JP | 2004-04-30 | 4/2004 |
| JP | 2005205028 | 8/2005 |
| JP | 2009-10-15 | 10/2009 |
| JP | 2010-10-14 | 10/2010 |
| JP | 2013-04-25 | 4/2013 |
| JP | 2013146302 | 8/2013 |
| JP | 2014176260 | 9/2014 |
| JP | 201541203 | 3/2015 |

(56) References Cited

FOREIGN PATENT DOCUMENTS

| | | |
|---|---|---|
| KR | 100735565 | 7/2007 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2013-08-15 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Neto et al., Human-Machine Interface Based on Electro-Biological Signals for Mobile Vehicles, 2006, IEEE, p. 2954-2959 (Year: 2006).

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.

Patent Cooperation Treaty, "International Search Report," and English-language translation thereof issued in International Application No. PCT/AT2016/060110, by European Searching Authority, document of 8 pages, dated Mar. 23, 2017.

Thrun et al., "Probabilistic Robotics"; 1999, 492 pages.

Choset et al., "Principles of Robot Motion", Theory, Algorithms, and Implementations, Chapter 6—Cell Decompositions, 2004, document of 41 pages.

Durrant-Whyte et al., "Simultaneous Localization and Mapping (SLAM): Part I The Essential Algorithms", in: IEEE Robotics and Automation Magazine, vol. 13, No. 2, pp. 99-108 Jun. 2006.

Konolige et al., "A Low-Cost Laser Distance Sensor," 2008 IEEE International Conference on Robotics and Automation, Pasadena, CA, USA, May 19-23, 2008, document of 7 pages.

Oh et al., "Autonomous Battery Recharging for Indoor Mobile Robots," Massachusetts Institute of Technology Press, Aug. 30, 2000, document of 6 pages, XP055321836.

Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27.

Mahyuddin et al., "Neuro-fuzzy algorithm implemented in Altera's FPGA for mobile robot's obstacle avoidance mission", TENCON 2009-2009 IEEE Region 10 Conference, IEEE, Piscataway, NJ, USA, Jan. 23, 2009; document of 6 pages.

Vasquez-Gomez et al., "View planning for 3D object reconstruction with a 52. mobile manipulator robot," 2014 IEEE/RSJ International Conference on Intelligent Robots and Systems, 20140914 IEEE, pp. 4227-44233.

The State Intellectual Property Office of the People's Republic of China, "The 53. First Office Action," and English translation thereof; issued in Chinese patent application No. 201680078988,0, dated Oct. 24, 2020; document of 23 pages.

* cited by examiner

ROBOT-ASSISTED PROCESSING OF A SURFACE USING A ROBOT

CROSS REFERENCE TO RELATED APPLICATIONS

This application is a Continuation-In-Part Application and claims the benefit of PCT/AT2016/060110 designating the United States, filed Nov. 15, 2016, the entirety of which is herein incorporated by reference and which claims priority to German Patent Application No. DE 10 2015 119 865.7, filed Nov. 17, 2015.

TECHNICAL FIELD

The present disclosure relates to a robot for the processing of surfaces such as, e.g. for cleaning floors (vacuum cleaner robots), for mowing grass, for painting surfaces, etc. The present disclosure further concerns a method carried out by the robot for the efficient performance of the given task by the robot.

BACKGROUND

In recent years, autonomous mobile robots are being increasingly employed, for example, to clean floor surfaces or to mow a lawn. In both cases it is crucial that the given surface be entirely processed by a surface processing device arranged on the robot such as, for example, a brush. Simple devices can do without the generation and use of a map of the area of robot deployment by, for example, randomly moving over the area to be cleaned. More complex robots use a map of the area of robot deployment that they generate themselves or that is provided to them in electronic form. This system makes it possible to record the already processed surfaces.

These modern autonomous mobile robots with mapping function try to use, when processing (e.g. cleaning) a surface, a process pattern that is as systematic as possible. The pattern must be adapted to the complex circumstances of the area of operation, such as an apartment with furniture. Further, the robot must be capable of reacting to unexpected objects such as, for example, people moving about in its area of operation or obstacles that are difficult to detect with the robot's sensors. Still, it may occur that some areas of the floor will be left out in the process. A robot may possess a detection module to detect such an omitted surface at the end of or during its run, in order to clean it afterwards. For this purpose, it is once again necessary to move across the already processed surface, which reduces the processing efficiency and increases the processing time needed for the entire area.

This application discloses a robot and a method for improving existing robots and methods for an autonomous mobile robot to process a surface (e.g. to clean a floor surface) and to thus increase the efficiency of the robot.

SUMMARY

In the following, a method for the processing of a surface of an area to be processed by an autonomous mobile robot will be described. In accordance with one embodiment, the surface is processed by the robot along path segments of a robot path in accordance with a first process pattern. The area to be processed is broken down, depending on a current position of the robot, into a first area which, according to the process pattern, should already have been processed, into a second area that has yet to be processed and into a third area that is currently being processed. The robot can then test whether the first area has, indeed, been completely cleaned.

In accordance with a further embodiment, the method comprises the processing of the surface along path segments of a robot path in accordance with a first process pattern, wherein the path segments exhibit a certain sequence. The method further comprises detecting—during the processing of a given path segment of the path segments—whether, in at least one path segment that lies before the first path segment in the sequence, an as of yet unprocessed area exists that would have already been cleaned given the unimpeded performance of the processing according to the sequence.

In accordance with a further embodiment, the method comprises controlling the robot in order to process the area in accordance with a first process pattern, the monitoring of an area in the environment of the robot, wherein the area has a permanent position relative to the robot, and controlling the robot in order to process the area in accordance with a second process pattern if an accessible and unprocessed area is detected in the monitored area.

Further, a method for controlling an autonomous mobile robot using a processing module for performing an activity within an area will be described. In accordance with one of the examples described here, the method comprises processing the surface of the subarea Along a robot path, identifying features of the robot's environment during the processing in order to detect obstacles and the automatic planning of a bypass route around a detected obstacle, wherein the planning is limited to a planning subarea that moves together with the robot and encompasses only a part of the area.

In accordance with a further embodiment, the method comprises processing a surface of the subarea Along a robot path, identifying features of the robot's environment during the processing in order to detect obstacles and an automatic planning of a bypass route around a detected obstacle, wherein during the planning, a processing gain is considered that arises due to a processing of the surface carried out while and/or after bypassing the obstacle.

In accordance with a further embodiment, the method comprises the processing of a surface of the subarea Along a robot path in accordance with a first process pattern, the automatic determination of the robot's position in the area by means of a sensor arrangement on the robot, the determination of a measurement value for the inaccuracy of the determined position, as well as the adaptation of the first process pattern depending on the measurement value for the inaccuracy (a measurement value for the inaccuracy is, naturally, also a measured value for the accuracy).

Further embodiments concern a robot that is connected with an internal and/or external data processing device that is configured to execute a software program which, when it is executed by the data processing device, causes the robot to carry out the methods described here.

BRIEF DESCRIPTION OF THE FIGURES

Various embodiments will be explained in the following in greater detail by means of the examples illustrated in the figures. The illustrations are not necessarily true to scale and the embodiments are not limited to only the aspects shown. Instead importance is placed on illustrating the underlying principles of the embodiments described herein. The figures show.

DETAILED DESCRIPTION

In the following, the various embodiments will be explained using an autonomous robot for the cleaning of floor surfaces (e.g. a vacuum cleaner robot) as an illustrative example. The embodiments described here, however, may also be applied to other areas in which a surface should be processed as completely as possible by an autonomous mobile process. Further examples of such robots include, among others, process for removing a floor layer (for example, by means of sanding), process for applying, for example, paint on a surface and process for mowing a lawn, for cultivating farmland, as well as autonomous harvesting process.

A mobile autonomous robot 100 generally includes a drive module which, for example, may comprise electric motors, gears and wheels, by means of which the robot can theoretically arrive at any point of a floor surface. The robot further includes a processing module such as, for example, a cleaning module for cleaning the floor surface such as, for example, a brush or an apparatus for sucking in dirt (or both). Such robots are well known and predominantly differ according to the manner with which the environment is navigated, as well as according to the strategy that is applied when processing the floor surface as, e.g. during a cleaning process.

Figure 1A:
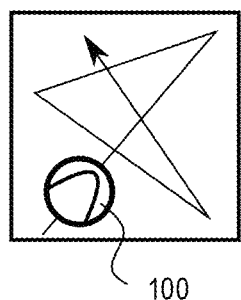
FIGS. 1A-1C show various examples of navigation strategies for an autonomous robot for the processing of a surface.
Figure 1B:
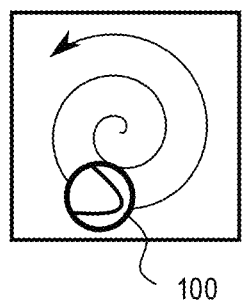
Figure 1C:
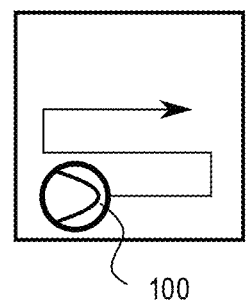

FIG. 1 shows various examples of navigation strategies. In FIG. 1A, the robot 100 employs a random navigation method, in the course of which it makes do without generating and using a map (cf. e.g. publication EP 2287697 A2 from iRobot Corp.). With this method some floor surfaces in an area to be processed G are cleaned repeatedly, while it is possible that other floor surfaces will not be cleaned at all.

In order to increase the efficiency of the floor processing, systematic cleaning patterns were developed to process an area G in one run and with as few overlaps of the processed surface as possible. These process patterns are created, for example, by connecting together path segments to a robot path that the robot processes. By connecting path segments, a spiral formed process pattern (see FIG. 1B) or a meandering process pattern (see FIG. 1C, also designated as zigzag pattern or boustrophedon pattern) is created. For example, a meandering process pattern 200 consists of numerous long, straight and nearly parallel path segments that are connected by short connection segments (straight and/or curved). These process patterns may have various designs and may be combined with each other. In addition to this they may be combined with various strategies such as, for example, strategies for avoiding obstacles or for cleaning heavily soiled sections of the area G.

In order to ensure that the process pattern is reliably followed and that the robot paths are adapted to the area of robot deployment, the robot 100 can compile a map of the environment and, at the same time, determine its position on this map with the aid of suitable sensors, e.g. arranged on the robot and by employing a SLAM method (SLAM: *Simultaneous localization and mapping*, see e.g. H. Durrant Whyte and T. Bailey: "*Simultaneous Localization and Mapping (SLAM): Part I The Essential Algorithms*", in: IEEE Robotics and Automation Magazine, Vol. 13, No. 2, pgs. 99-110, June 2006). This makes it possible to specifically access and clean every (accessible) point in a given area G. In the ideal case, every point is covered only once in order to avoid cleaning areas that have already been cleaned, significantly reducing the time needed to clean the area G. One such suitable sensor is, for example, a sensor for measuring the distance to objects in the environment such as, e.g. an optical and/or acoustic sensor that operates by means of optical triangulation or running time measurement of an emitted signal (triangulation sensor, time-of-flight camera, laser scanner, ultrasonic sensors). Further typical examples of suitable sensors are cameras, tactile sensors, acceleration sensors, gyroscope sensors and odometers.

In order to ensure that every point of the area G has been cleaned, the robot can save the already processed surfaces on a cleaning map (a map on which the already cleaned sections have been marked). For this purpose, e.g. a raster map may be used, on which the area G is sectored into numerous quadratic zones and for every quadrate it is saved as to whether the zone has been cleaned. The length of such a quadrate's edge may correspond, for example, to the size of the cleaning module or it may be smaller. As an alternative, the robot, e.g. can save its trajectory (the course of the robot path) and calculate from this those parts of the area G that have already been processed and those that have yet to be processed.

The specific area to be processed G may be confined within existing obstacles such as walls (e.g. an apartment or a separate room of an apartment). More advanced devices are capable of further defining the area G using virtual boundaries. For example, the virtual boundary on a map of robot deployment may be defined by a user or by the robot (e.g. in the form of boundary lines). The robot, for example, can sector the entire area into numerous zones (e.g. the numerous rooms of an apartment or numerous parts of a room) and these can be processed one after the other.

In general, the robot 100 is able to, by means of sensors, identify features of its environment and, based on the identified features, detect obstacles. The features identified by the sensors can also be used to localize the robot on an electronic map. Despite the use of map-based navigation, it is almost impossible to obtain a reliable advance planning of a cleaning of area G due to sensor and map data that is prone to error. The cause of this are obstacles that are difficult for the sensors arranged on the robot to detect, as well as dynamic obstacles such as people or pets that might temporarily block the robot's path. A long-term (spatial and/or temporal) advance planning is thus only to a very limited extent possible. It is therefore necessary that the process pattern employed by the robot be dynamically adapted to unanticipated (e.g. due to being unforeseeable) events. In the following, various approaches for the robot to dynamically adapt its previously specified process pattern when needed (e.g. when an unanticipated obstacle is detected) will be described. These enable the robot to efficiently, i.e. "intelligently", react to a dynamically changing, (e.g. due to displaced obstacles), environment.

Figure 2A:
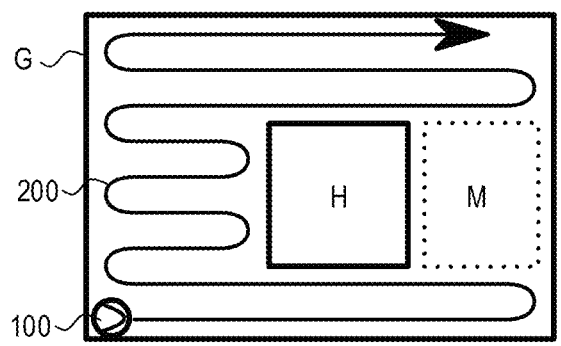
FIGS. 2A and 2B schematically illustrate the problem of "omitted" (not processed) areas when the previously calculated path of the robot has to be adapted due to an obstacle.

FIG. 2A shows, as an example, a state-of-the-arts autonomous mobile robot 100 systematically cleaning "from bottom to top" (as per the map shown in FIG. 2A) an area G while employing a meandering path 200. Due to an obstacle H, a part of area G cannot be cleaned over its entire width, causing the subarea M to be omitted. In order to avoid collision, the robot turns before the obstacle and continues the processing along the next (on the map the next higher) straight-line segment of the meandering path 200. Thus, the segments of the meandering path 200 that are blocked by the obstacle H are shortened (as compared to a situation without obstacle H). When the robot 100 employs a cleaning map on which the subzones of the area to be processed G that have already been cleaned are saved, after completing the cleaning, the robot 100 can identify the omitted subarea M (e.g. the unprocessed area of area G, see dotted line in FIG. 2A) and move directly to this area to process it. However, in order to do so the robot must move over an already cleaned area which lowers the efficiency rate (e.g. the processing time per surface unit of the area G) of the entire processing operation.

Figure 2B:
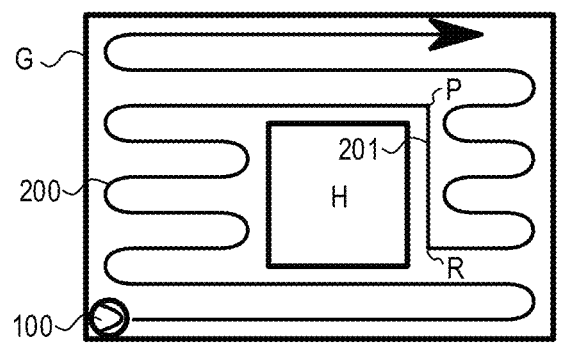

FIG. 2B shows an example of how the systematic processing of the area G can be improved by employing the approach described here. The autonomous mobile robot 100 cleans the area G systematically "from bottom to top" over a meandering path 200. While doing so, the robot 100 regularly checks (for example, using a cleaning map on which the already cleaned surfaces are designated) whether an omitted subarea M lies "below" the robot and may be directly accessed. At point P the robot 100 detects just such a subarea M and correspondingly adapts the process pattern in order to clean it. The subarea M is designated as "omitted" because it would have already been cleaned by the point in time at which the robot reaches point P if it had not been for the obstacle H. The presence of the obstacle H thus caused the omission of the subarea M. In the following, various approaches for the robot to autonomously detect omitted areas will be explained.

It should be noted here that the descriptions "from bottom to top" or "from top to bottom", as well as "above the robot's position" or "below the robot's position" are not intended to be restricting and are only used in reference to the examples shown of the maps of the robot's environment. Actually, a coordination system for any systematic cleaning along a meandering path can be chosen such that the robot begins its processing of the area G within this coordination system "at the bottom" and ends it "at the top".

Figure 3A:
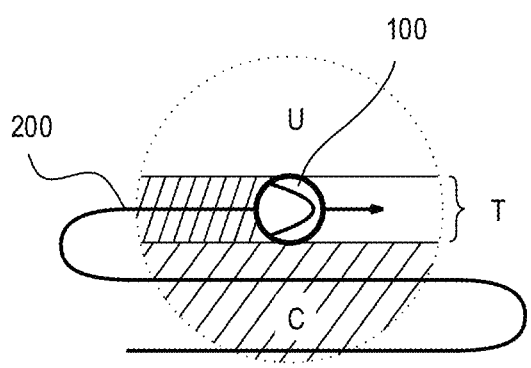
FIGS. 3A-3C show examples of cleaning maps (maps on which already cleaned areas are marked) in the environment of the robot with and without disruption caused by an obstacle.

In order to detect an omitted subarea M (see FIG. 2A) while carrying out the cleaning, the robot can, for example, continuously monitor the processing status (cleaning status) of its immediate surroundings as recorded on the cleaning map. FIG. 3A shows, as an example, the cleaned area in the robot's 100 environment, consisting of numerous interconnected straight-lined path segments, during a systematic cleaning using a meandering path 200. The surface is broken down into a path segment T currently being processed (processing status T), a subarea U that has not yet been cleaned (processing status U) and a previously cleaned subarea C (processing status C). When the cleaning runs systematically (without disruption and along, e.g. a meandering path), such a breakdown of the robot's 100 environment is always possible and easy to determine. Further, the robot 100 can determine at every location in the area G (i.e. at that point in time at which it arrives at a given point), which parts of the area G should already have been cleaned, (and thus exhibit the processing status C), given a disruption-free processing. By comparing this target status (cf. FIG. 3A) with the actual status indicated on the cleaning map (cf. FIG. 3B), omitted subareas M can be identified. An example of this is schematically shown in FIG. 3B.

Figure 3B:
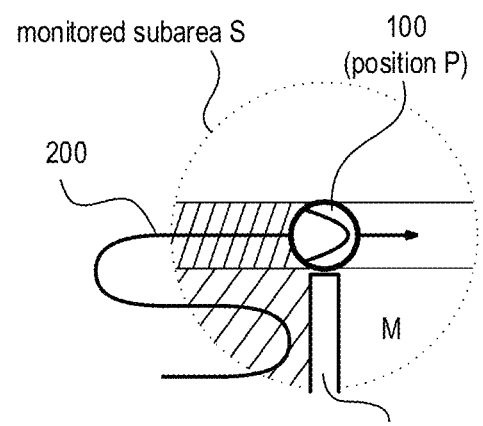

FIG. 3B shows the cleaned surface in the environment of a robot 100 during a systematic cleaning along a meandering path 200. In this example (cf. FIG. 2A) the area to be cleaned G has not been entirely processed due to an obstacle H, creating an omitted subarea M. By comparing these cleaning results (actual status) with the planned or desired results (target status) shown in FIG. 3A, the robot can identify the omitted surface and immediately clean it. After detecting an omitted subarea M (upon arriving at the position P), the robot 100 can immediately decide whether or not to clean the omitted area depending on whether its size (surface area, length, width or a combination of any of these values) exceeds a previously specified threshold within the monitored environment of the robot. In addition to this, the robot 100 will only decide to clean an omitted area if it can be directly accessed (without having to move around an obstacle) from the position of the robot 100. In particular, in the example of FIG. 3B, the robot 100 will only decide to clean the omitted surface M after having passed the obstacle H (that is, after having arrived at position P) without having encountered a disrupting obstacle.

Figure 3C:
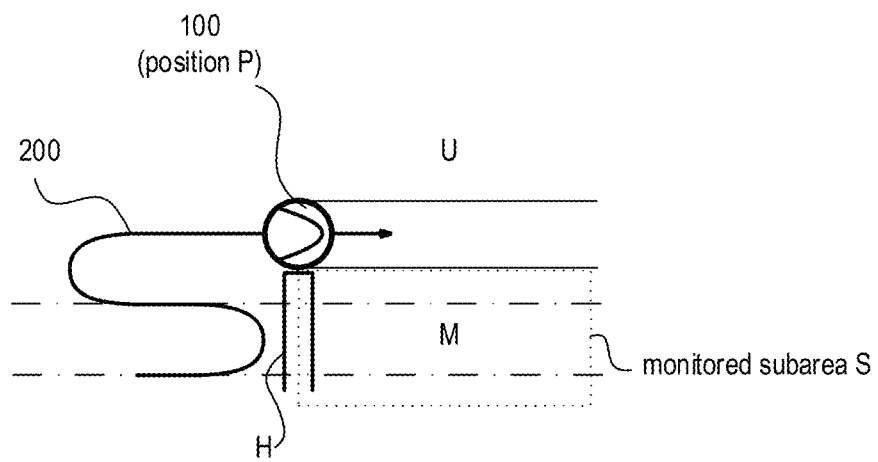

The monitored environment may be confined, as illustrated in FIG. 3, to a circular subarea S that is systematically arranged around the robot 100 (see FIGS. 3A and 3B). A rectangular subarea extending ahead in the moving direction of the robot (see FIG. 3C) is also possible. Alternatively, it may be confined to the subarea that is expected to have been cleaned. In this case the monitored area is confined, for example, to the subarea Covered by the last straight-lined path segment (or by the last two parallel straight-lined path segments) of the meandering path 200. The monitored environment can lie, for example, next to the currently processed path segment T and extend ahead for a length equal to two robot diameters. The monitored environment thereby changes as movement along the cleaning pattern advances. Thus, in the example of FIG. 3, only the area to the right (in the direction of movement) of the robot 100 is relevant. The robot moves in the opposite direction along the next parallel path segment (as in the previous one) and thus the area of relevance is to the left (in the direction of movement) of the robot 100. In addition, the monitored subarea C can be adapted to the features of the cleaning map used. If this is a raster map, for example, the monitored subarea S is rectangular (see FIG. 3C) and contains a specified number of zones.

Adapting the cleaning pattern in order to clean an omitted subarea M can be carried out using various means. In the example of FIG. 2B described above, the robot 100 moves along an obstacle to the right as close as possible to the end of the omitted subarea M (on the map, to the first point R of the subarea M) and continues at this point the systematic cleaning along a meandering path 200. This achieves a "seamless" transition into the cleaning of the previously omitted subarea M and allows for the area to be cleaned G to be entirely processed in one run, without having to move over the same area twice. In addition, for example, the distance between two neighboring meander paths within the omitted subarea M can be adapted such that the robot can once again continue the processing at point P (or near it) after the subarea M has also been processed. In FIG. 4, alternatives to the approach to cleaning the omitted subarea M that are illustrated in FIG. 2 are shown.

Figure 4A:
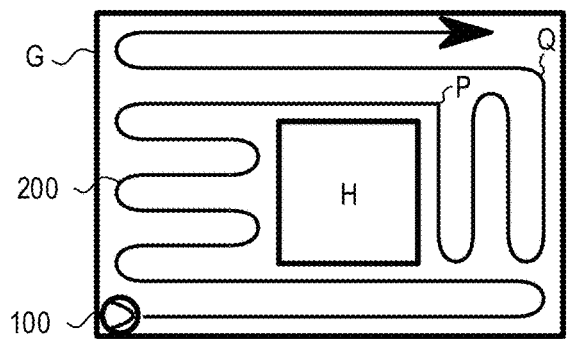
FIGS. 4A and 4B show various possibilities for adapting the robot path in order to process an area that was previously omitted due to an obstacle.

FIG. 4A shows a further possibility for adapting the robot path to process an subarea M, previously omitted due to an obstacle H, involving turning the meander direction 90°. This is done, for example, in adaptation to the geometric form of the omitted subarea M in order to reduce the number of meandering paths in the case of a (in the meander direction) very narrow yet (crosswise to the meander direction) long omitted area. In this case, for example, the path interrupted at point P (the surface that would have been cleaned if the robot had continued at point P) can also be cleaned. After completing the cleaning of the omitted subarea M the original cleaning pattern is continued at point Q.

Figure 4B:
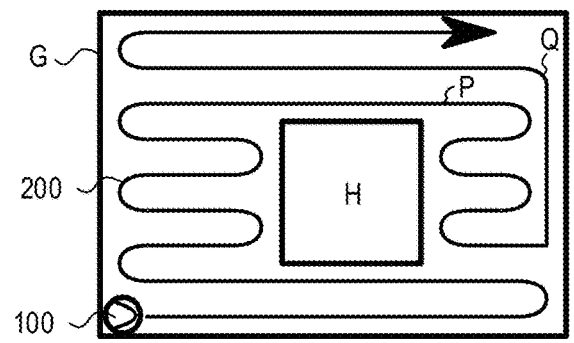

FIG. 4B shows an additional possibility for adapting the process pattern, here the cleaning pattern, in this example by mirroring the meandering path. In this case, the cleaning of the current path is continued after an omitted subarea is discovered at point P. At the end of this path, a new meandering path below the current path (in the omitted area) is chosen. After the omitted subarea M has been entirely cleaned, the robot continues the cleaning of the remaining area. The straight-lined segment of the meandering path through the subarea M can be shortened so that a strip at the margin (on the right side in FIG. 4B) remains unprocessed. This strip is then cleaned in continuation of the cleaning of the remaining part of area G when the robot returns to point Q. In this example, the robot returns along the side of subarea M that faces away from the obstacle H.

For the selection of a suitable adaptation of the process pattern, the robot can employ its existing map data. This map data, however, may contain errors. Alternatively, the robot may, at least partially, reexamine the borders of the omitted subarea M. For this purpose the robot can, for example, carry out at least a partial run following along the bordering edges of the omitted area. The borders of the omitted subarea M, for example, are given by obstacles and by the already cleaned surfaces. When doing so, the already cleaned surfaces may be, at least partially, overlapped in order to improve the cleaning results (cf. FIG. 12).

Figure 5:
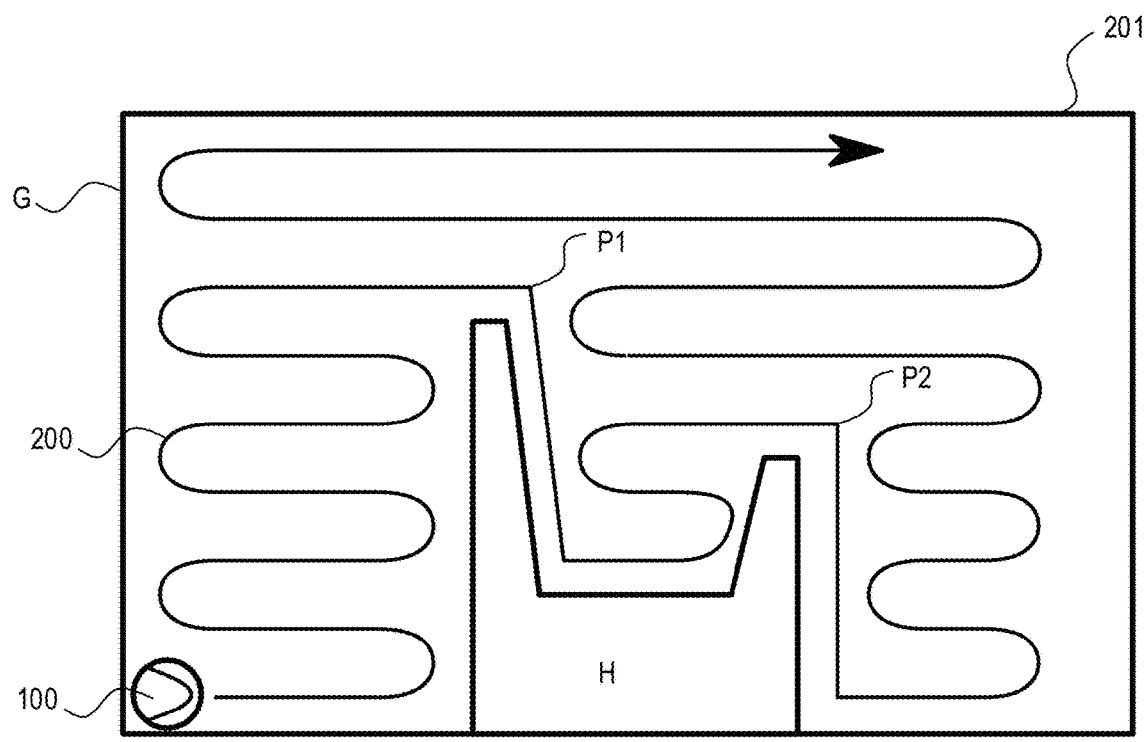
FIG. 5 shows a further possibility for the gradual adaptation of a robot path in order to process an area that was previously omitted due to an obstacle.

FIG. 5 shows a preferred variation of adapting the process pattern that is also robust in cases in which the omitted areas are complex (due to more complex obstacles H). Here the robot 100, after detecting an omitted subarea M1 at point P1, moves forward by a first "local minimum" (i.e. the robot follows the obstacle along an "edge" into an omitted area up to a corner). While moving along the outer edge, the robot 100 detects the local minimum, for example, based on an orientation of the robot facing the direction of the last meandering path, and/or of the robot no longer moving away from the last meandering path, and/or of the robot moving again in the direction of the last meandering path. In this case the robot again begins the systematic cleaning by means of a meander "from bottom to top". At point P2 it again detects an omitted subarea M2 and begins to clean it in accordance with the method described above. This enables the robot 100 to systematically and completely clean the area G in spite of the complex obstacle H.

The preceding explanations concern, for the most part, the detection (recognition as such and the determination of position and size) of an omitted subarea M (or of numerous omitted areas M1, M2) that were omitted from processing for any given reason (e.g. because of an obstacle H that was not considered when the robot path was originally planned). In the following, the dynamic planning of a robot path for the processing of surfaces will be discussed. In general, a surface is processed according to a defined process pattern, for example a meandering pattern, according to which the processing is carried out along a meandering path consisting of numerous straight-line path segments running parallel to each other and their corresponding connecting segments. A process pattern must be adapted to the actual specifics of the area G, such as its geometry and the obstacles found within it. This is carried out, in accordance with the method described here, dynamically during processing in order to make it possible to react to certain events such as, e.g. moving obstacles and/or obstacles not yet detected (by the sensors) that were not, or could not have been, considered during the initial path planning.

A process pattern comprises at least one path which is to be processed by the robot. The width w of the path corresponds to the processing module of the robot and the path may be comprised of numerous path segments (e.g. numerous parallel straight-line segments in the case of a meandering pattern). Here it should be noted that, for the sake of illustrative simplicity, in the figures it is assumed that the processing module has the same width as that of the robot. In practice, the processing module need not extend over the entire width of the robot. The robot should primarily process as wide a path as possible. Obstacles (or other objects) that block the planned processing path that the robot is moving along should be bypassed, if this is expedient. Robots are known that move completely around the obstacle before the decision is made concerning the further cleaning, which can lower the efficiency of the cleaning. Other robots end the processing of the current path segment upon encountering an obstacle and begin processing a different path segment. Still other robots follow the obstacle until an abort condition is fulfilled. This abort condition may be, for example, that the robot once again finds itself on the path segment it just left (upon detecting the obstacle) or that the robot finds itself on a different path segment of the meandering path that has not yet been processed.

Figure 6:
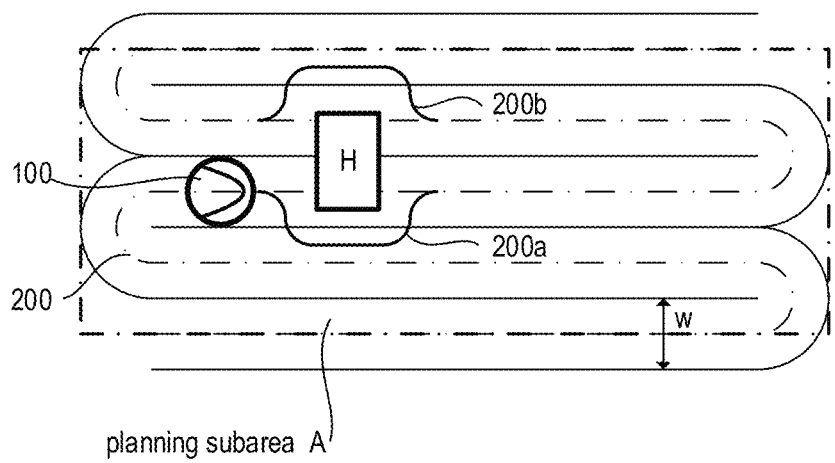
FIG. 6 illustrates various approaches to the dynamic adaptation of a robot path for bypassing an obstacle.
Figure 7:
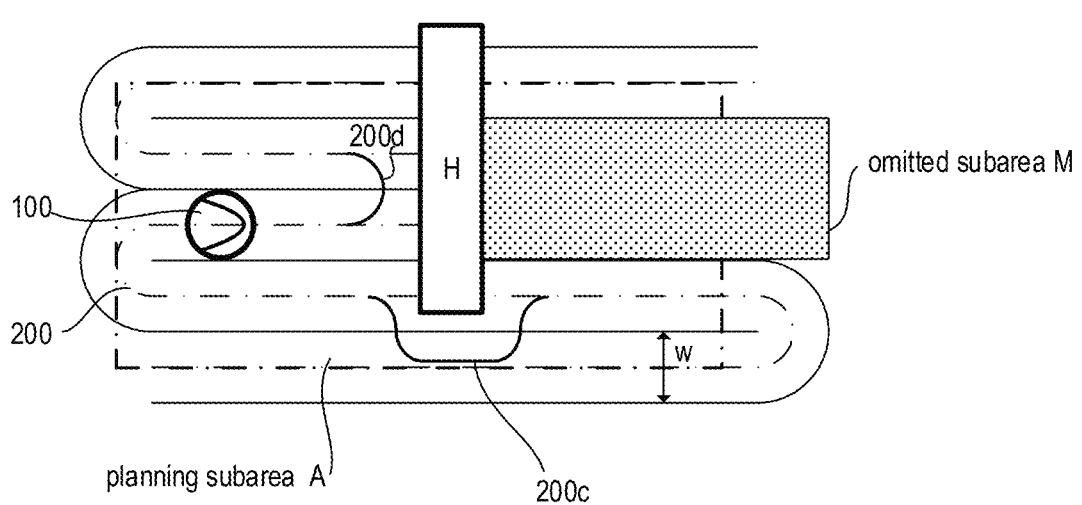
FIG. 7 illustrates various approaches to the dynamic adaptation of a robot path for avoidance and for the search of a new starting point to continue the cleaning.

Combining an initial planning of a path segment of a robot path in accordance with a process pattern with reactive algorithms enables the robot to make "more intelligent" decisions, thus improving the process efficiency and achieving the most complete coverage possible of the area G. For this, the autonomous mobile robot 100 must decide, based on environmental data, whether it should continue the cleaning of the path currently being processed or whether it would be more efficient to begin the cleaning of a new path segment. When doing so, it may weigh the process gain (i.e. the total increase of processed surface) against the needed costs in the form of detours and/or the double cleaning of a surface and it can confine the planning to a corridor (in the following designated as planning area) around the path segment currently being processed in order to reduce the planning effort. This will be explained in the following using examples illustrated in FIGS. 6 and 7.

Avoidance maneuver: When the autonomous mobile robot cleans a floor in an area G on which one or more obstacles H are standing, for example with a meandering process pattern, it must be able to decide whether it would be more effective to bypass the obstacle (see FIG. 6, avoidance path segments 200a and 200b) in order to then continue the processing behind the obstacle H, or to begin a new path segment of the meandering path 200 (cf. FIG. 7, reverse path segment 200d to the next regular path segment). The problem that arises here is that the cost and the number of contingencies to be considered both increase exponentially together with the size of the subarea Considered in the planning. Therefore, to reduce the planning effort, the area for which the planning is carried out can be confined to planning subarea A (see FIGS. 6 and 7) around the currently travelled path segment. The planning subarea A, for example, is rectangular and extends at predefined lengths to the right and left of the current path segment (width of the planning area). In the direction of the path segment (i.e. in or against the travel direction of the robot), the planning area is confined within the area to be processed G, which gives it the form of a corridor. Alternatively, the planning subarea May extend from the current robot position, along the path segment, and up to the border of area G and/or up to a maximum planning horizon (e.g. 5 m before the robot, e.g. defined by the range of a sensor).

If the robot discovers one or more obstacles H that block the processing of the current path, it tests whether bypassing it within the corridor (planning subarea A) is possible. If, as in the example of FIG. 7, it is not possible to bypass it within the planning subarea A, it looks for a starting point (e.g. at the end of the reverse path segment 200d) for a new meandering path. In this case, the width of the corridor automatically restricts the possible avoidance maneuver. The robot can make a decision regarding a possible avoidance maneuver without having to evaluate the planning results. In order to avoid unneeded avoidance maneuvers, the corridor (planning subarea A) is, for example, three to four (or five) times wider than the robot or than a path segment (width w, which in the figures is shown to be of the same width as that of the robot, but which need not necessarily be so). In addition, the size of the corridor is chosen such that exclusively obstacles that block the current path can be bypassed. The corridor is thus at least twice as wide (crosswise to the straight-line path segments of the meandering path 200) as the robot.

Figure 8:
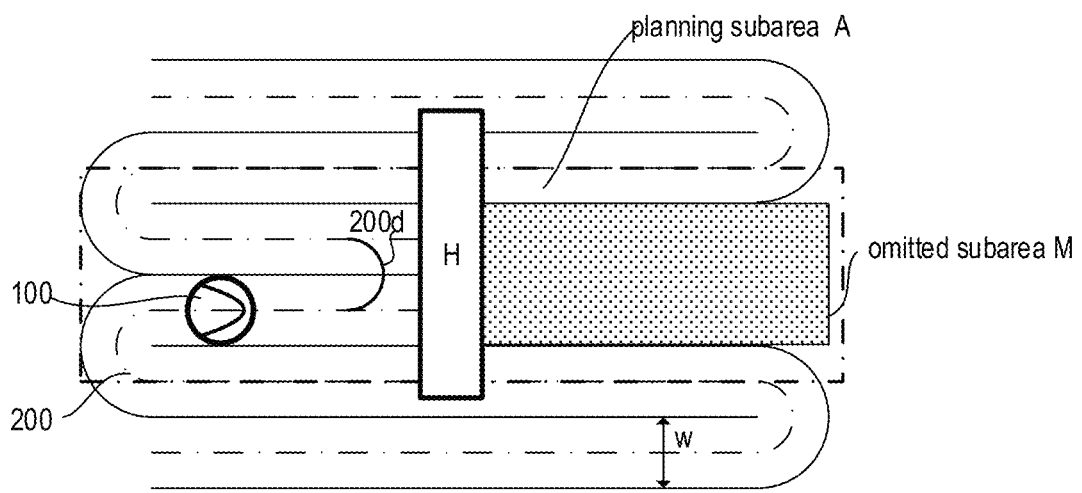
FIG. 8 shows a situation similar to that of FIG. 7, however with a planning area that is nonsymmetrical to the robot and that is considered when planning an adapted robot path for avoiding or bypassing an obstacle.

It should be noted that the planning subarea A may be arranged symmetrically or offset to the currently processed path segment. For example, in the case of symmetric robots, or in order to simplify the calculations, a symmetric planning corridor may be used. When a meandering process pattern is used the corridor (planning subarea A) can be chosen to extend farther into the unprocessed area than into the area that has already been processed. An example of such a situation is shown in FIG. 8, wherein the planning subarea A extends across the travel direction of the robot 100 and by only one path width w to the right of the robot 100 (on the map downward) but by two path widths (i.e. 2 w) to the left (on the map upward).

There are various known algorithms for avoiding or bypassing one or more obstacles (see, e.g. R. Siegwart, I. R. Nourbakhsh and D. Scaramuzza: "Introduction to Autonomous Mobile Robots", The MIT Press). For example, an obstacle can be bypassed using a "bug algorithm". Here the robot follows around the edge of the obstacle until it can once again enter the path segment belonging to the original process pattern. While the robot is attempting to bypass the obstacle it tests whether it is moving within the planning subarea A used for this planning. If the robot leaves this subarea, it interrupts the attempted bypass of the obstacle and looks for a starting point for a new path that corresponds to the cleaning pattern. Such a case only arises if the robot has incorrectly assessed the obstacle as when, for example, due to the obstacle moving (or having moved) or due to it being difficult for the sensors to detect, the previously described planning had determined that it was possible to bypass the obstacle within the corridor although this is actually not the case.

Figure 9:
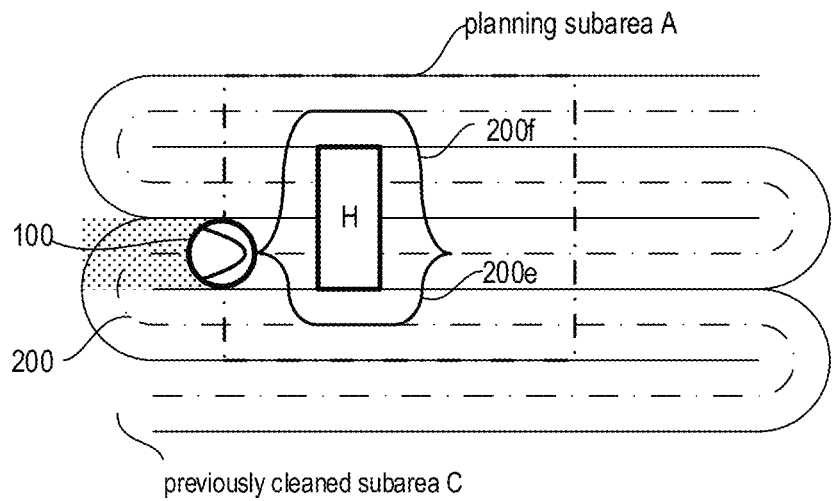
FIG. 9 illustrates various strategies and decision criteria for the selection of an avoidance path segment (bypassing the obstacle on the left or the right).

When testing whether and how the robot can bypass an obstacle, the robot may additionally test whether the avoidance maneuver will result in a process gain (i.e. a previously unprocessed surface will be processed. This situation is illustrated in FIG. 9. For example, during a run along a meandering path the area to the right of the obstacle may be free, but may also have already been completely cleaned (see, e.g. FIG. 9, the avoidance path segment 200e leads for the most part through an already processed subarea C. The process gain along this avoidance path segment 200e would therefore be relatively small). In this case the robot can test whether it can bypass the obstacle within the corridor on the left (see, e.g. FIG. 9, the alternative avoidance path segment 200f leads exclusively through an unprocessed subarea U and hence the process gain along this avoidance path segment 200f would be high). If this is not possible, it can look for a starting point for a new path segment that corresponds to the meandering pattern (see FIG. 7, reverse path segment 200d). The calculation of the process gain can be performed, for example, by comparing the surface cleaned during the planned avoidance maneuver with the previously cleaned surface (subarea C) saved on the cleaning map.

In a second example, the robot 100 cleans using meandering path segments that are connected together and can bypass the obstacle in both directions with a process gain. In order to avoid leaving an isolated uncleaned area, in this case the obstacle should be bypassed in the direction of the last meandering path. There is therefore a preferred direction for bypassing an obstacle that is aligned with the cleaning pattern and faces in the direction of the already cleaned area. In accordance with this aspect, in the example of FIG. 6 the avoidance path segment 200a was preferred over the avoidance path segment 200b.

In some cases the robot 100 is not symmetrically designed, but may instead possess, for example, a side brush on its right edge that enables it to clean the surface up to the border of an obstacle to the right of the robot 100, whereas an unprocessed area would remain at an obstacle to the left of the robot 100. This may be considered, for example, with the previously described method of assessing the cleaning gain. Alternatively, the robot may have a set preferred direction that ensures that the robot bypasses an obstacle while keeping the obstacle to its right.

Figure 10:
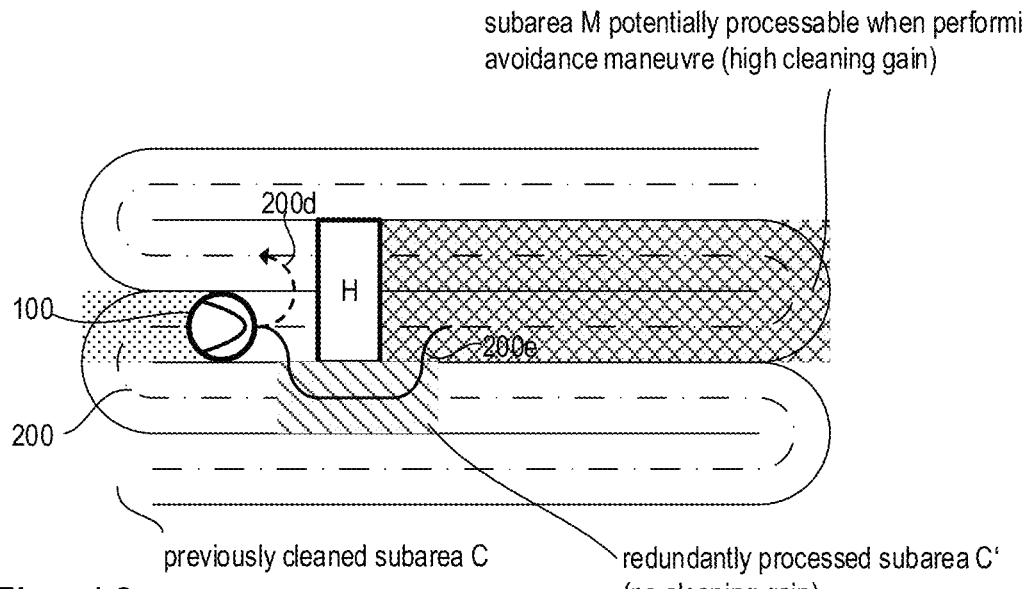
FIG. 10 illustrates various strategies and decision criteria for the selection of an avoidance path segment (bypassing the obstacle or continuing the cleaning in a different straight-line segment of the meandering path).

The expected cleaning gain behind an obstacle H, which can be determined using the cleaning map, can be taken into consideration by the robot 100 as an additional decision criterion for bypassing an obstacle. Thus an obstacle will be bypassed when the effort involved in a possible double cleaning during the avoidance maneuver is clearly lower than the expected cleaning gain. Such a situation is illustrated in FIG. 10. Here a small subarea C' is processed a second time (thus redundantly) when the robot moves counterclockwise around the obstacle H along the avoidance path segment 200e. This avoidance maneuver, however, makes it possible to continue the processing with the much larger subarea M (high cleaning gain). Thus the robot can decide either to look for a starting point for a new meandering path, and to turn back along the reverse path segment 200d if the effort, in the form of moving through an already cleaned area (effort measured as the surface area of the subarea C') exceeds a predefined threshold or if the cleaning gain falls below a predefined threshold. Alternatively, the robot can make its decision based on the ratio of the already cleaned surface of subarea C' that must be travelled over to the surface of subarea M that will potentially be cleaned. If a surface area is left uncleaned in the process (that is, if an omitted area is created), this can be taken care of with the method described further above (cf. FIGS. 1 to 5) for adapting a cleaning pattern to the cleaning of an omitted area.

An analogous approach is possible when the currently cleaned path segment leads over a previously cleaned area. This previously cleaned subarea May belong, for example, to the surroundings of an obstacle. Here the robot decides, e.g. based on the expected cleaning gain and/or on the costs entailed in cleaning an already cleaned area, whether the planned path through the already cleaned area will be continued or whether to look for a starting point for a new meandering path.

A meandering process pattern consists of nearly parallel straight-line path segments, arranged at a distance to each other that corresponds to the path width w (width of the processing module) minus a desired overlap. With a small overlap of, for example, one to two centimeters, a complete coverage of the surface can be ensured despite small inaccuracies that arise during the localization and/or control of the robot. If the overlap comprises more than 50%, the floor surface can be processed at least twice. Other process patterns can be generated with, for example, any desired starting segment and with further path segments having an appropriately chosen overlap (i.e. a suitable distance to) the respective preceding path segment. In the following example, shown in FIG. 11, the procedures followed by the robot when dynamically adapting a path segment of a meandering path and when dynamically looking for a new starting point on the next segment will be illustrated.

Figure 11:
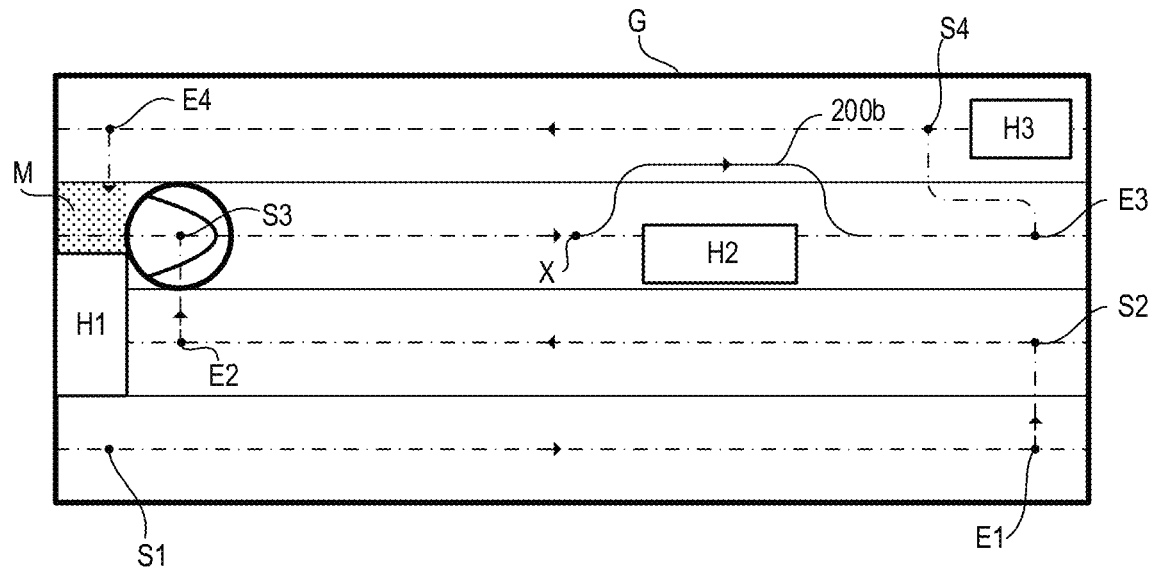
FIG. 11 illustrates an example of the systematic processing of an area with obstacles in accordance with the strategies described here.

First, for the area to be processed G, e.g. straight-line path segments, either adjacent to each other or overlapping, are determined in accordance with the specified process pattern (overlapping segments are not shown in FIG. 11). In the present example, selecting the starting point S1 is unproblematic and the starting point is set in the first path segment near a corner of the area to be cleaned, for example, in the corner closest to the current position of the robot. When the robot arrives at the end of a path segment (ending points E1, E2, E3), it looks for a starting point (starting points S2, S3, S4) on the following path segment. In general, the chosen starting point will be as close as possible to the current position of the robot 100 (hence, directly "above" each ending point on the following path segment, see FIG. 11, points E1 and S2). If this starting point is not accessible (e.g. blocked by an obstacle), the starting point may be shifted along the path segment until an accessible starting point is reached. In FIG. 11, for example, there is an obstacle H3 in the last path segment that causes the starting point S4 to be shifted to the left. At the ending point E4 the robot identifies the omitted subarea M, as described above with reference to the FIGS. 2 to 5, and it can proceed to clean this subarea M. This concludes the processing of the area G. If no accessible starting point is found in the entire following path segment then the cleaning of the area has apparently been completed. In FIG. 11, for example, there is no fifth straight-line path segment and thus no corresponding starting point S5.

Beginning at an accessible starting point, the possible cleaning gain in both directions along the new path is determined. In this case, the planning may be confined to the previously described corridor and may take into account the principles described above regarding planning the subarea surrounding obstacles and the repeated cleaning of a previously cleaned area.

Based on the thus determined possible cleaning gain, the robot 100 can decide in which direction it will begin cleaning the path or whether a new starting point on the path or a new path should be chosen. The following possibilities, for example, exist: (a) In one direction there is no cleaning gain to be achieved because cleaning here has already been carried out or because there is an obstacle in the way. In the second direction there is a cleaning gain to be achieved. The robot begins cleaning in this second direction. (b) A cleaning in both directions is possible. In one of these, however, the cleaning gain only corresponds to the base area of the robot (and thus lies below a specified threshold). The robot shifts the starting point in this direction in order to be able to clean the entire possible path length at once. (c) In both directions the cleaning gain is smaller than a minimum value or even zero, for example due to larger obstacles standing both to the right and the left. The robot then tries to identify a new path segment. (d) In both directions the cleaning gain lies above a threshold, in this (in practice rather unlikely) case, cleaning is carried out in the direction providing the greatest cleaning gain.

In this example (see FIG. 11), the robot processes the second path segment, moving from starting point S2 to the left until it reaches the obstacle H1. Since it is not possible to continue the cleaning behind the obstacle H1, the robot does not attempt to bypass it and instead ends the processing of the second path segment (ending point E2). The next starting point S3 in the third path segment is chosen directly above the ending point E2, causing the processing of a subarea M lying above the obstacle H1 in the third segment to be omitted. As a reasonable cleaning gain can only be achieved in the third path segment towards the right, the robot 100 continues processing to the right until it reaches obstacle H2 at point X. This obstacle can be easily bypassed and the robot adapts the path segment in accordance with the avoidance path segment 200b (see also FIG. 9). Upon reaching ending point E3 of the third segment, the robot looks for starting point S4 in the fourth path segment. As mentioned above, this starting point is shifted to the left because of obstacle H3. From starting point S4 a cleaning gain can only be achieved by moving to the left and so the cleaning is resumed in this direction up to ending point E4. The next, fifth segment (not shown) is inaccessible due to the border (e.g. a wall) of area G and thus there is also no starting point S5 to be found. The cleaning has thus been completed.

Figure 12:
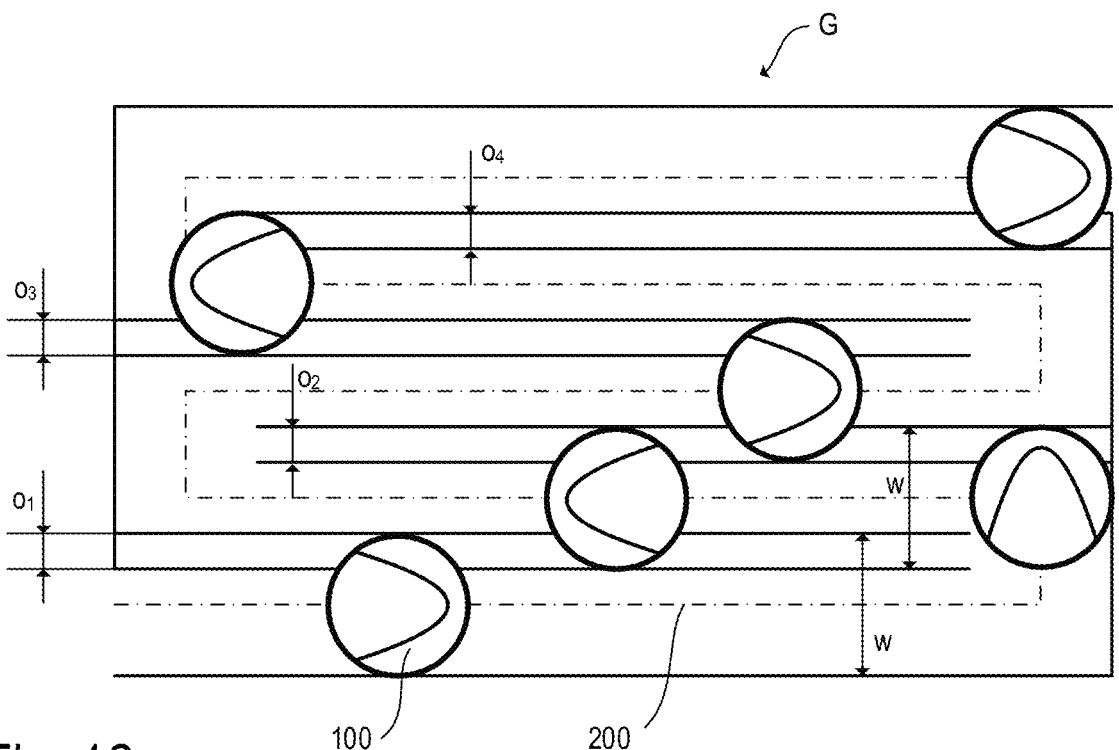
FIG. 12 illustrates an example of the systematic processing of an area having overlapping path segments.

In order for the robot 100 to be able to clean a surface, for example, using a meandering path 200, it must be capable of determining and correcting its position (for example, by means of the SLAM method). However, due to, for example, measurement or movement errors, inaccuracies in the positioning and/or localization can always occur that may result in strips between two cleaned meandering paths being left uncleaned. In order to avoid this, the processing is performed leaving an overlap between the path segment currently being cleaned (see FIG. 3A, surface T) and the previously cleaned path segment (see FIG. 3A, surface C). An example of this overlap is shown in FIG. 12, in which the width of the path segment is designated as w and the overlap between two adjacent path segments is designated as $O_1$, $O_2$, $O_3$, $O_4$, etc. The distance between two neighboring, predominantly parallel path segments is thus smaller than the width w of a path segment (namely W-$O_1$, W-$O_2$, etc.). The occurring inaccuracies generally have to do with the material used for the floor surface and with the environment detected by the robot's sensors and may vary greatly depending on the area of robot deployment. It is therefore advisable to determine a value for the inaccuracy of the positioning and/or localization and to adapt the cleaning pattern accordingly.

Statistical SLAM methods, for example, are able to estimate the inaccuracy present in the localization in addition to the position of the robot 100. Based on this estimate, for example, the overlap $O_1$, $O_2$, $O_3$, etc. between the path segment currently being processed (surface T) and the previously cleaned surface (subarea C) can be determined and adapted, thus ensuring a complete cleaning of the surface despite the inaccurate localization. At the same time, the overlap in areas in which the localization is more reliable can be reduced to a minimum, thus accelerating the cleaning of the surface.

For example, the SLAM method used may be based on an extended Kalman filter or on a so-called particle filter, by means of which the probability distribution of the expected robot position and surrounding obstacles (e.g. a wall) is determined. Based on this probability distribution, the standard deviation of the robot's position relative to the surrounding obstacles, for example, can be taken as a value representing the inaccuracy in the localization. If the planned overlap then equals, for example, a twofold standard deviation, then there is a theoretical probability of approximately 2% that an uncleaned area will remain between the path segment currently being processed (surface T) and the previously cleaned surface (C) (negative overlap). Repeating the localization further reduces the probability, thus rendering it negligible in practice. An inaccuracy in the positioning can also be evaluated using a SLAM method. Here, for example, in a first step, a prediction is made as to where the robot, having followed the movement orders of the robot controller, is located (positioning). In a second step, for example, this first prediction is corrected based on measurements of the distance to obstacles (e.g. a wall) in the environment (localization). This means that the robot's (target) position is known but that, due to odometry errors (e.g. caused by the floor covering) it is not at the originally planned position. The adjustment needed here may also be suitably used as a value to determine a needed overlap $O_1$, $O_2$, $O_3$, etc.

The overlap can be set, for example, when selecting a starting point for a path segment of the meandering path. In addition, it may be determined during the cleaning of a path that the inaccuracy of the localization has suddenly increased or lessened (or the accuracy of the localization, which is virtually the same thing). In such a case, for example, the processing of the current path can be interrupted in order to select path with an overlap that corresponds to the new measure of inaccuracy or the planning of the path currently being processed can be dynamically adapted. Thus, an overlap (e.g. $O_1$ between the first and the second path segment in FIG. 12) can also be adjusted while moving along a segment.

In some cases, the specific overlap between the path segment currently being processed (surface T) and the previously cleaned surface C may become so large, that it is no longer possible to carry out a systematic cleaning using the chosen cleaning pattern. The cleaning strategy can be adapted to such cases. For example, the process pattern may be employed twice, wherein the second time, the pattern is applied at an angle (e.g. of 90°) and/or offset (e.g. by about one half of the path's width) relative to the first use of the pattern. If the inaccuracy is so large that a goal-directed navigation is no longer or hardly possible, then, for example, a simple random and/or chaotic process pattern may be employed. In some cases, the inaccuracy in the positioning and localization of the robot is not isotropic. For example, in a long corridor the robot can easily measure its distance to the walls right and left of it, but it has no orientations points from which it could determine its position along the walls (i.e. in a direction parallel to the walls). In such a case of direction-dependent uncertainty it provides an advantage to arrange the process pattern such that the direction in which the overlapping is to occur is the direction with the greater accuracy. In a corridor, for example, the robot should therefore plan path segments that run parallel to the walls.

The robot can measure the inaccuracy of the positioning and/or localization in the entire area G to be cleaned. The measured inaccuracy values can also be saved on the robot's map and taken into consideration at the start of a future deployment. In this way the robot can identify at least one part of the area to be cleaned in which the inaccuracy value predominantly exceeds a given threshold. The robot is then able to adapt the process pattern solely for this part. In this manner, for example, in a very large room the robot 100 can clean systematically in the proximity of obstacles that it can use to localize itself, and it can clean chaotically in the middle of the room where there are no detectable obstacles. This breakdown of the area G based on inaccuracy can, for example, be permanently saved by the robot (e.g. on a map). The methods disclosed herein may allow for improved efficiency and accuracy of such robots.

Figure 13:
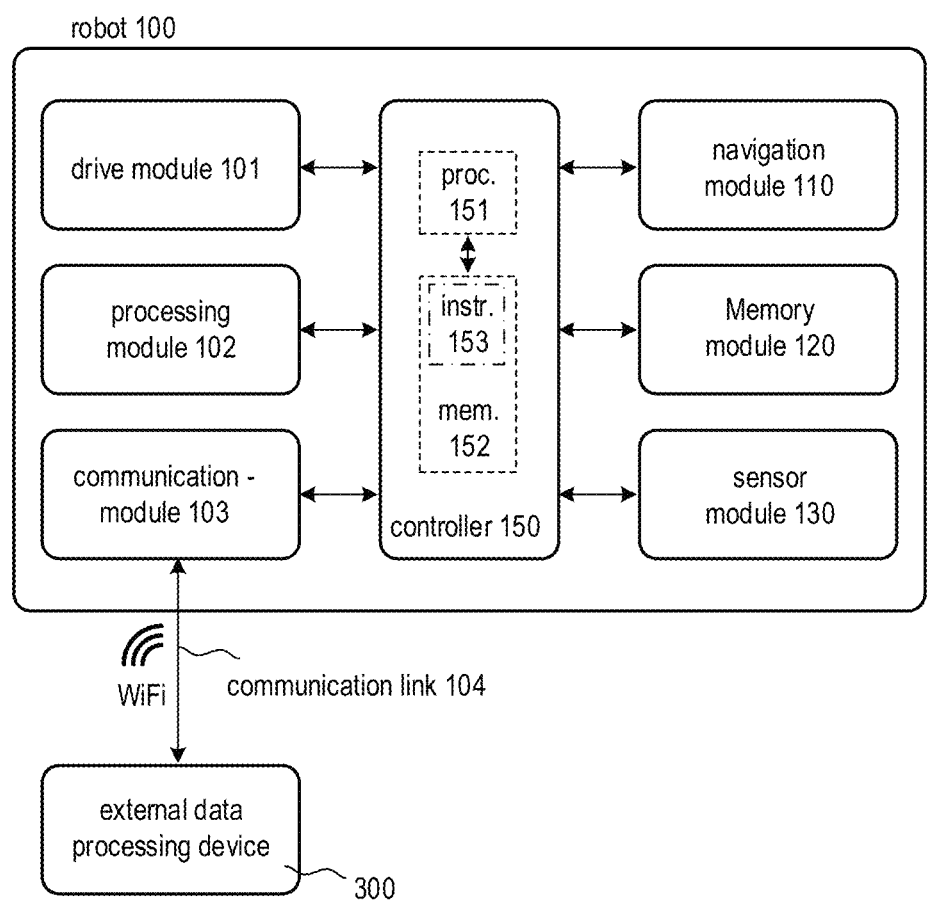
FIG. 13 is a block diagram illustrating the internal structure of a robot that is capable of performing the methods described herein.

FIG. 13 illustrates in a block diagram an exemplary structure of an autonomous mobile robot system with robot 100. The robot 100 may be a service robot and is capable of autonomously performing one or more tasks as described with regard to the embodiments discussed above. These tasks may be, e.g., cleaning or monitoring (surveillance) of an apartment or other structure or the transport of objects within an apartment (or any other premises). As shown in the example of FIG. 1, the robot 100 includes various modules. In this regard, a module may be an individual sub-assembly (hardware), a software component for controlling the behavior of the robot that performs a desired task in the area of robot deployment, of a combination of both (e.g. dedicated hardware with connected peripheral devices and suitable software/firmware). The software responsible for the behavior of the robot 100 may be executed by the controller 150 (control module) of the robot 100. For this purpose the controller 150 may include a data processing device including one or more processors 151 or processor cores as well as a machine readable medium, such as memory 152 (e.g. random access memory or any other volatile or non-volatile memory), which, at least during operation, includes software instructions 153 that, when executed by the processor 152 of the controller 150, cause the robot to perform the activities as described with regard to the embodiments discussed above. The software execution may be at least partly "outsourced" to an external data processing device 300 that is connected to the robot via a communication module 103 and a communication link 104. The external data processing device may be a personal computer, a workstation, a server connecting to the internet (e.g. providing a cloud computing service), etc., and connected to the robot 100, for example, via a local computer network or the internet. At this point it is mentioned that the "intelligence" of the robot may also be distributed across different modules of the robot and need not to be concentrated in the controller 150 (e.g. controller 150, navigation module 110 and sensor module 130). Some method steps may be implemented by two or more modules cooperating or two or more modules performing different partial steps or a method. When a specific method step is performed "by the robot", not necessarily all steps need be performed by the hardware and software included in the robot, rather some or all steps, or parts thereof, may also be performed using the external data processing device 300 which is coupled to the robot 100 via the communication link. Notably, the operative features and functionality provided by the above robots, systems and methods may increase the efficiency of processing devices that are being utilized to facilitate the functionality provided by the robots, systems and methods. Such efficiencies can include that less processing power may need to be utilized because the processors and memories do not need to perform actions, operations, and analyses that have already been conducted. As a result, the functionality provided by the robots, systems and methods may provide substantial savings in the usage of processing resources by utilizing the software and functionality provided in the present disclosure.

In the present example, the robot includes a drive module 101 that, for example, includes electric motors, gears and wheels. It may further include a power source and power electronics used to drive the robot's drive train. The drive module 101 enables the robot to—theoretically—reach any point within the robot deployment area. As mentioned, robot 100 may have access to a communication link 104 via communication module 103 that may include an interface to a local computer network (WiFi, ZigBee, etc.), the internet or to a point-to point wireless link (e.g. Bluetooth) or any other suitable communication means. Further, the processors and memories may be utilized to optimize the usage of computing resources and/or power resources while executing the operations conducted by the robot. As a result, such features provide substantial operational efficiencies and improvements over existing technologies.

The robot may further include a processing module 102 that may be, for example, a cleaning module configured to clean the floor. The cleaning module my include brushes, a vacuum unit or the like. In order to be able to perform a task autonomously, the robot may have a navigation module 110, with which the robot may orient itself and navigate across the robot deployment area using so-called navigation features, i.e. features, with which the robot may orient itself in its environment, such as landmarks (furniture, doorways, corners or a room, walls, etc) that may be detected by the robot using its sensor module 130. The navigation module 110 may, for example, employ an obstacle avoidance strategy and/or a SLAM (simultaneous localization and mapping) algorithm in connection with one or more electronic maps of the robot deployment area. The map(s) of the robot deployment area may be newly generated by the robot during a deployment (e.g. while performing a task). Alternatively, a previously stored map may be used during a deployment. The stored map may have been generated by the robot itself during a preceding deployment or provided by the user or by another robot. The memory module 120 may include a non-volatile memory (e.g. a solid state disc, SSD) and may contain the maps of the robot deployment area. Alternatively, the maps may be stored externally, e.g. in or by the external data processing device 300 (e.g. in a computer located in the apartment or by a cloud server).

The sensor module 130 may include one or more sensors for measuring distances to objects in the robot's environment such as optical sensors, acoustic sensors which operate using as such known triangulation or time-of-flight measurement (e.g. triangulation sensor, time-of-flight camera, laser range finder, ultrasonic sensors, etc.). Other suitable sensors may be cameras (in connection with image processing techniques), tactile sensors, gyroscopic sensors, inertial measurement units (IMUs), odometers and/or floor clearance sensors.

While the machine-readable medium is shown in an example embodiment to be a single medium of memory 152, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The term "machine-readable medium" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

Although various embodiments have been illustrated and described with respect to one or more specific implementations, alterations and/or modifications may be made to the illustrated examples without departing from the spirit and scope of the features and structures recited herein. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the present disclosure.

What is claimed:

1. A method for processing a surface of an area using a robot, the method comprising:
    processing the surface along a path segment of a robot path according to a first process pattern;
    breaking down the area to be processed, depending on a current position of the robot into a first subarea that, according to the process pattern, should already have been processed, a second subarea that still is to be processed and a third subarea, that is currently being processed;

continuously testing, while processing the area, whether the first subarea has been completely processed; and in response to detecting an omitted subarea, which has not been completely processed, immediately deciding whether to process the omitted area.

2. The method in accordance with claim 1, further comprising;

testing whether the first subarea is completely accessible and can be travelled over by the robot.

3. The method in accordance with claim 1, wherein the robot is configured to save parts of area on a map that have actually been processed.

4. The method in accordance with claim 3, wherein testing whether the first subarea has already been completely processed is carried out based on the map.

5. The method in accordance with claim 1, wherein, in accordance with the first process pattern, the area to be processed is broken down into a number of path segments that are sequentially processed according to a sequence.

6. The method in accordance with claim 5, further comprising:

testing, during the processing of a certain path segment of the path segments, whether an unprocessed subarea exists in at least one path segment lying before the certain path segment in the sequence, wherein the unprocessed subarea should have already been processed given an unimpeded completion of the processing according to the sequence.

7. The method in accordance claim 1, further comprising:

identifying an omitted subarea in a first subarea if a test reveals that the first subarea has not been entirely processed; and interrupting the processing of the area in accordance with the first process pattern and processing the omitted subarea in accordance with a second process pattern.

8. The method in accordance with claim 7, wherein the processing of the omitted subarea comprises:

moving the robot along a border of the omitted subarea up to a first point in the omitted subarea that is at the greatest distance possible to the third subarea, processed before the interruption.

9. The method in accordance with claim 8, wherein the robot recognizes that the robot has reached the first point by determining, while moving along the border of the omitted subarea, that the robot is no longer moving away from the third subarea, nor is the robot moving closer to the third subarea again or that the direction of the robot movement once again predominantly corresponds to a direction of the robot movement before the interruption.

10. The method in accordance with claim 7, wherein the robot plans the processing of the omitted subarea in accordance with the second process pattern such that the processing of the omitted subarea ends in the third subarea, processed before the interruption.

11. The method in accordance with claim 10, wherein the second process pattern is a meandering pattern and a distance between two neighboring, predominantly parallel path segments of the meandering path are adapted such that the robot ends the processing of the omitted subarea in the third subarea and can then continue a previously interrupted processing operation.

12. The method in accordance with claim 1, wherein the test of whether the first subarea has been entirely processed is positive when no continuous unprocessed part of the first subarea is larger than a minimum surface area.

13. The method in accordance with claim 1, wherein, when the area to be processed is broken down, only a subarea of the area is considered, wherein this subarea moves together with the robot.

14. Autonomous robot comprising:

a data processing device that is configured to execute a software program which, when executed by the data processing device, causes the robot to:

perform a method in accordance with claim 1.

15. A method for the processing of a surface of an area using a robot, the method comprises:

processing the surface along path segments of a robot path in accordance with a first process pattern, wherein the path segments have a sequence;

detecting, during the processing of a certain path segment of the path segments, whether, in a path segment lying before a first the certain path segment in the sequence, an unprocessed subarea exists that should have been processed given an unimpeded execution of processing in accordance with the sequence;

in response to detecting an omitted subarea, which has not been completely processed, immediately deciding whether to process the omitted area.

16. The method in accordance with claim 15, wherein the processing of the path segments is carried out from a starting point of a respective path segment to an ending point of the respective path segment.

17. The method in accordance with claim 16, wherein the ending point is set when the robot detects an obstacle, a border of the area to be processed is reached, or both.

18. The method in accordance with claim 17, wherein, when the robot reaches the ending point of the respective path segment, the robot looks for a starting point on a sequentially next path segment.

19. The method in accordance with claim 15, further comprising:

saving which subareas of the surface of area have already been processed on a map of the area during processing, wherein the detection of unprocessed areas is carried out based on data saved on the map.

20. A method for processing a surface of an area using a robot, the method comprising:

controlling the robot to process the area in accordance with a first process pattern;

monitoring a subarea in an environment of the robot, wherein the subarea has a fixed position relative to the robot; and controlling the robot to process the area in accordance with a second process pattern if an accessible and unprocessed subarea, which should already have been processed, is detected within the monitored subarea.

21. The method in accordance with claim 20, wherein the second process pattern is adapted to process the unprocessed subarea.

22. The method in accordance with claim 20, wherein the robot moves along a robot path, which, in accordance with the first process pattern, comprises nearly parallel path segments.

23. The method in accordance with claim 20, wherein controlling the robot includes avoiding detected obstacles in accordance with specifiable rules.

24. The method in accordance with claim 20, further comprising:
   testing, based on specifiable criteria, whether an ending point of the processing in accordance with the second process pattern has been reached, and
   continuing the processing of the area in accordance with the first process pattern.

25. The method in accordance with claim 20, wherein the subarea in the environment of the robot that is monitored changes as the robot moves across the environment.

\* \* \* \* \*